(12) United States Patent
Kajimoto

(10) Patent No.: US 11,269,473 B2
(45) Date of Patent: Mar. 8, 2022

(54) TOUCH PANEL CONTROL APPARATUS CORRECTING TOUCH POSITION BASED ON NUMBER OF TOUCH POINTS

(71) Applicant: DENSO TEN Limited, Kobe (JP)

(72) Inventor: Nobuaki Kajimoto, Kobe (JP)

(73) Assignee: DENSO TEN Limited, Kobe (JP)

( * ) Notice: Subject to any disclaimer, the term of this patent is extended or adjusted under 35 U.S.C. 154(b) by 0 days.

(21) Appl. No.: 16/931,524

(22) Filed: Jul. 17, 2020

(65) Prior Publication Data
US 2021/0124445 A1 Apr. 29, 2021

(30) Foreign Application Priority Data
Oct. 29, 2019 (JP) .............................. JP2019-196594

(51) Int. Cl.
*G06F 3/045* (2006.01)
*G06F 3/041* (2006.01)

(52) U.S. Cl.
CPC .......... *G06F 3/045* (2013.01); *G06F 3/04186* (2019.05); *G06F 2203/04104* (2013.01)

(58) Field of Classification Search
CPC .............................. G06F 3/045; G06F 3/04186
See application file for complete search history.

(56) References Cited

U.S. PATENT DOCUMENTS

| | | | | |
|---|---|---|---|---|
| 2001/0033274 A1* | 10/2001 | Ong | .......................... | G06F 3/045 345/173 |
| 2003/0063073 A1* | 4/2003 | Geaghan | ............... | G06F 3/0488 345/173 |
| 2009/0189877 A1* | 7/2009 | Washino | .............. | G06F 3/04883 345/174 |
| 2010/0283761 A1* | 11/2010 | Chang | ...................... | G06F 3/045 345/174 |
| 2010/0321340 A1* | 12/2010 | Hsiao | ....................... | G06F 3/041 345/175 |
| 2012/0001854 A1* | 1/2012 | Tikkanen | ................ | G06F 3/045 345/173 |
| 2013/0106733 A1* | 5/2013 | Wang | ................... | G06F 3/04186 345/173 |
| 2015/0138108 A1* | 5/2015 | Xiang | .................... | G06F 3/0488 345/173 |
| 2017/0102799 A1* | 4/2017 | Cleary | ................... | G06F 3/0446 |

FOREIGN PATENT DOCUMENTS

JP 2011-123815 A 6/2011

* cited by examiner

*Primary Examiner* — Chun-Nan Lin
(74) *Attorney, Agent, or Firm* — Oliff PLC

(57) ABSTRACT

A control apparatus of a touch panel having a resistive film includes a microcomputer having a controller configured to function as a determination part and a corrector. The determination part determines a number of touch points indicating a number of simultaneous touch positions on the touch panel. The corrector corrects input coordinates indicating a touch position of each of the touch points using coordinate correction that differs depending on whether the touch panel is touched with a one-point touch in which the number of the touch points is one or a two-point touch in which the number of the touch points is two, which have been determined by the determination part.

10 Claims, 6 Drawing Sheets

TOUCH PANEL CONTROL APPARATUS CORRECTING TOUCH POSITION BASED ON NUMBER OF TOUCH POINTS

BACKGROUND OF THE INVENTION

Field of the Invention

The invention relates to a control apparatus and a correction method.

Description of the Background Art

Conventionally, for example, there has been a touch panel having a resistive film. Such a touch panel calculates input coordinates indicating a touch position based on an inter-terminal voltage of each of two resistive films provided on an operation surface (refer to Japanese Unexamined Patent Publication No. 2011-123815).

Furthermore, in such a touch panel, a resistance (hereinafter, referred to as "external resistance") is externally connected to each of the resistive films so as to reduce an influence of noise caused by static electricity.

However, when the external resistance is sufficiently large, the inter-terminal voltage is shifted by an amount of the external resistance. Thus, it is necessary to correct the input coordinates in accordance with the external resistance. In this case, in a one-point touch in which a number of touch points is one and a two-point touch in which the number of the touch points is two, if a same correction is performed, calculation accuracy of the input coordinates varies between the one-point touch and the two-point touch. As a result, both sets of the input coordinates cannot be accurately derived.

SUMMARY OF THE INVENTION

According to one aspect of the invention, a control apparatus of a touch panel having a resistive film includes a microcomputer having a controller configured to function as a determination part and a corrector. The determination part determines a number of touch points indicating a number of simultaneous touch positions on the touch panel. The corrector corrects input coordinates indicating a touch position of each of the touch points using coordinate correction that differs depending on whether the touch panel is touched with a one-point touch in which the number of the touch points is one or a two-point touch in which the number of the touch points is two, which have been determined by the determination part.

It is an object of the invention to provide a control apparatus and a correction method thereof which accurately derive input coordinates.

These and other objects, features, aspects and advantages of the invention will become more apparent from the following detailed description of the invention when taken in conjunction with the accompanying drawings.

DESCRIPTION OF THE EMBODIMENTS

A control apparatus and a correction method according to an embodiment will now be described in detail with reference to the accompanying drawings. This invention is not limited to the embodiment described in the following.

Figure 1A:
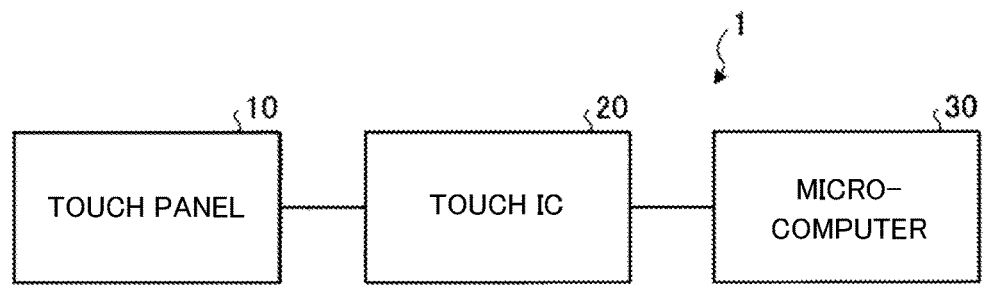
FIG. 1A illustrates a configuration example of an input system.
Figure 1B:
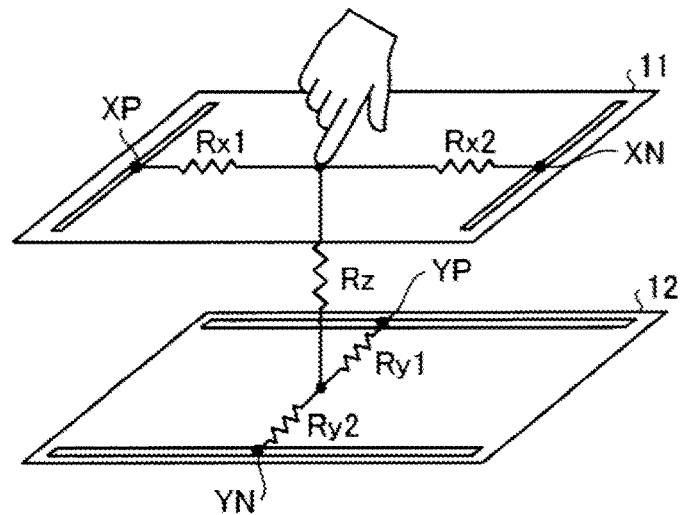
FIG. 1B illustrates an overview of a touch panel.
Figure 1C:
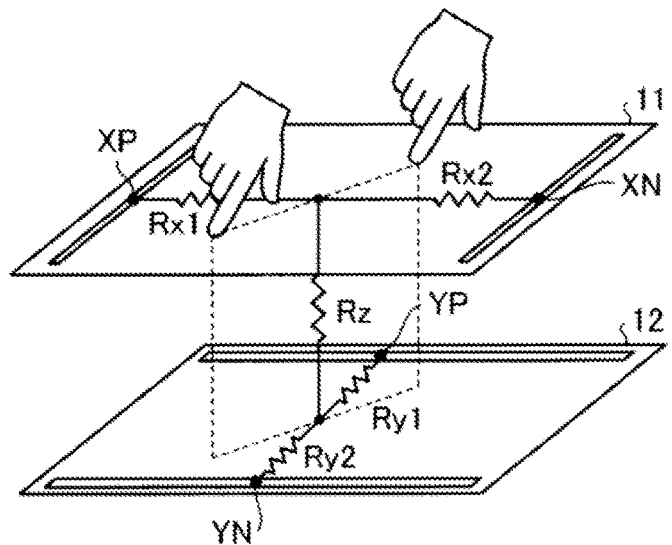
FIG. 1C illustrates the overview of the touch panel.
Figure 1D:
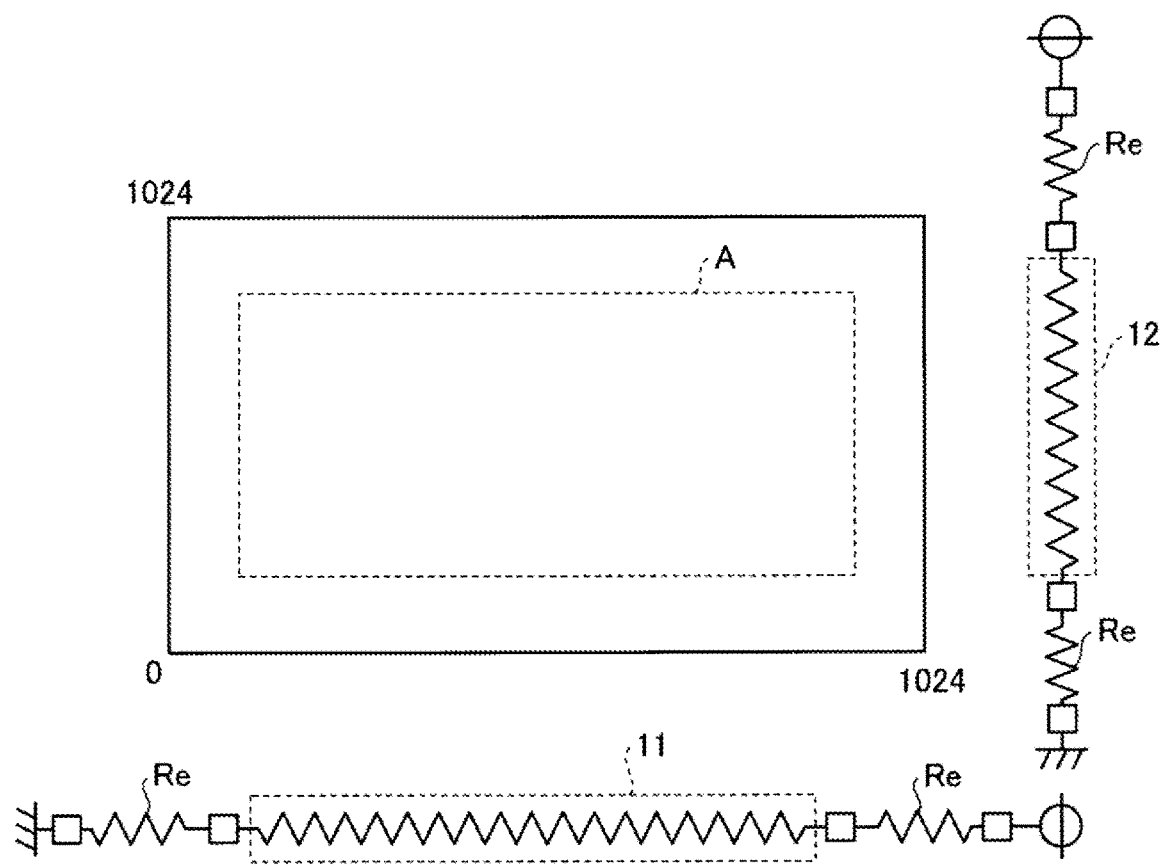
FIG. 1D is a schematic diagram of a resistive film.
Figure 1E:
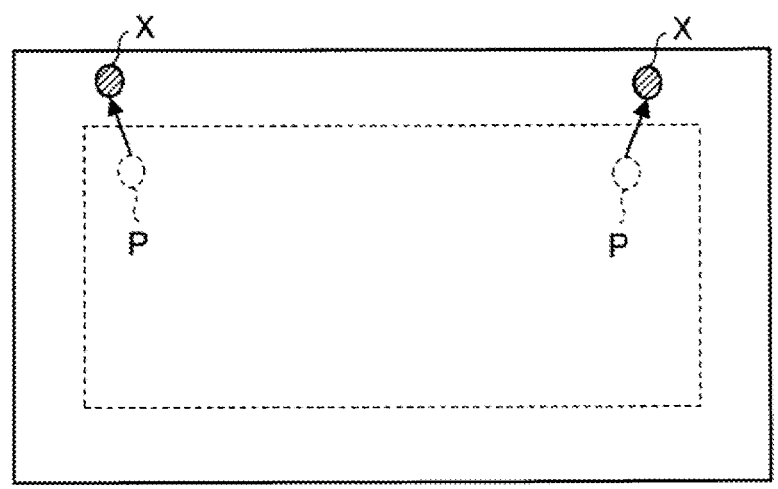
FIG. 1E illustrates one example of input coordinates in a two-point touch.

First, an overview of the control apparatus and the correction method according to this embodiment will be described with reference to FIG. 1A to FIG. 1E. FIG. 1A illustrates a configuration example of an input system. Each of FIG. 1B and FIG. 1C illustrates an overview of a touch panel. FIG. 1D is a schematic diagram of a resistive film. FIG. 1E illustrates one example of input coordinates in a two-point touch.

As illustrated in FIG. 1A, an input system 1 according to the embodiment includes a touch panel 10, a touch IC 20 and a microcomputer 30. The touch panel 10 is a touch panel having a resistive film. As illustrated in FIG. 1B, the touch panel 10 has a first resistive film 11 and a second resistive film 12.

For example, the first resistive film 11 detects an input coordinate of an X-axis coordinate in the touch panel 10, and the second resistive film 12 detects an input coordinate of a Y-axis coordinate in the touch panel 10. In an example shown in FIG. 1B, there is a resistance Rz between the first resistive film 11 and the second resistive film 12.

Figure 2:
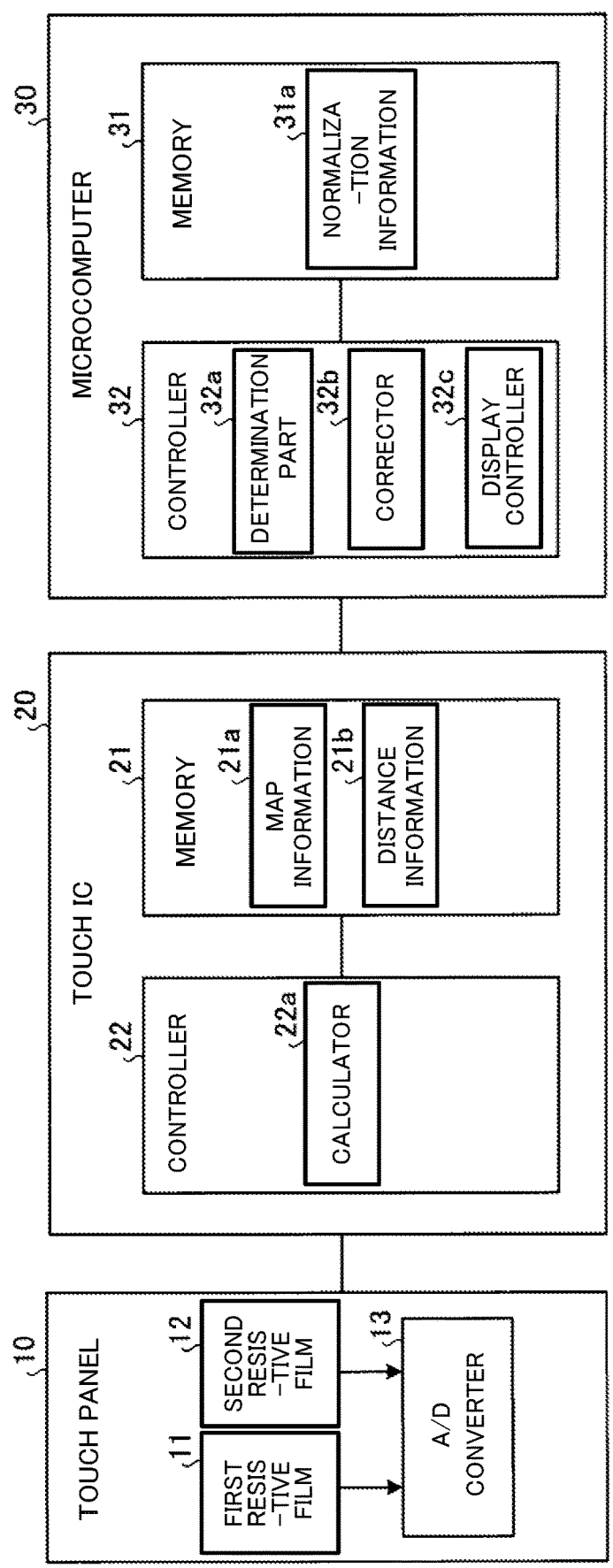
FIG. 2 is a block diagram of the input system.

The touch panel 10 has an operation surface (not shown) and an A/D converter 13 (refer to FIG. 2). When the operation surface is pressed, a value of an inter-terminal voltage of each of the first resistive film 11 and the second resistive film 12 is A/D converted, and the A/D converted value (hereinafter, just referred to as "conversion value") is output to the touch IC 20.

The touch IC 20 shown in FIG. 1A calculates the input coordinates corresponding to a touch position based on the conversion value input from the touch panel 10. The input coordinates calculated by the touch IC 20 is input to the microcomputer 30.

The microcomputer 30 shown in FIG. 1A is one example of the control apparatus and corrects the input coordinates to be input from the touch IC 20. Here, the microcomputer 30 according to this embodiment corrects the input coordinates using coordinate correction that differs depending on whether the touch panel 10 is touched with a one-point touch in which a number of touch points is one or a two-point touch in which the number of the touch points is two. As a result, it is possible to improve accuracy of the input coordinates in both the one-point touch and the two-point touch.

Here, a basic principle of the touch panel 10 having a resistive film will be briefly described with reference to FIG. 1B and FIG. 1C. In the touch panel 10 having a resistive film, the input coordinates corresponding to the touch position are calculated by a change in the inter-terminal voltage of each of the first resistive film 11 and the second resistive film 12, that is, a change in a resistance of each resistive film.

Specifically, as illustrated in FIG. 1B, for example, in the one-point touch in which the number of the touch points is one, if an inter-terminal resistance between terminals XP and XN is an inter-terminal resistance value Rx, the formula is expressed by "Rx=Rx1+Rx2". In this case, if an inter-terminal resistance between terminals YP and YN is an inter-terminal resistance value Ry, the formula is expressed by "Ry=Ry1+Ry2.

Thus, in the one-point touch, the touch IC 20 calculates the input coordinates indicating the touch position based on the change in the inter-terminal voltage of each of the first resistive film 11 and the second resistive film 12. In the two-point touch in which the number of the touch points is two, as a distance between two points of touch becomes longer, a number of the resistances that are connected in parallel in each of the first resistive film 11 and the second resistive film 12 increases. In other words, as the distance between the two points of touch becomes longer, the inter-terminal resistance decreases.

Therefore, in the two-point touch, the touch IC 20 calculates the distance between the two points of touch based on distance information indicating a relationship between the distance between the two points of touch and the inter-terminal resistance, and calculates the input coordinates of each touch position based on the distance between the two points of touch. One example of the distance information will be described below with reference to FIG. 4.

Here, in the input system 1 according to this embodiment, by further providing a resistance (hereinafter, referred to as "external resistance") that is externally connected to the touch panel 10, it is possible to improve resistance to noise caused by static electricity.

Specifically, as illustrated in FIG. 1D, for example, external resistances Re are provided at both ends of each of the first resistive film 11 and the second resistive film 12. For example, it is assumed that each of the external resistances Re is 100Ω, while a total sum of resistance values of the first resistive film 11 is 800Ω and the total sum of the resistance values of the second resistive film 12 is 300Ω.

Here, when a resistance value of each of the external resistances Re is sufficiently small, even if the input coordinates are calculated by neglecting the external resistances Re, the external resistances Re have little influence on the input coordinates. That is, when the resistance value of each of the external resistances Re is sufficiently small, the input coordinates are calculated without considering the external resistances Re.

On the other hand, as the resistance value of each of the external resistances Re increases, correction of the input coordinates is required. Specifically, the conversion value described above includes the resistance value of each of the external resistances Re, and the input coordinates calculated based on such a conversion value are shifted by an amount of the external resistances Re relative to actual input coordinates.

When the resistance value of each of the external resistances Re is sufficiently large, as illustrated in FIG. 1D, since an area in which the input coordinates are calculated is limited, it is necessary to provide an effective area A to the conversion value obtained by A/D converting a value of the inter-terminal voltage.

Here, the effective area A is smaller than a whole range of the conversion values (0 to 1024 in an example shown in FIG. 1D), and is obtained by excluding a range corresponding to the resistance values of the external resistances Re from the whole range described above. In other words, the effective area A is an area in which the input coordinates indicating the touch position are calculated.

Here, in the one-point touch, appropriate input coordinates are derived by correcting the input coordinates calculated based on the inter-terminal voltage using the resistance values of the external resistances Re. On the other hand, as illustrated in FIG. 1E, in the two-point touch, if the same correction is performed, each set of input coordinates X is shifted outward from each of touch positions P in the touch panel 10. This is because, in the two-point touch, each set of the input coordinates is calculated by considering the external resistances Re beforehand.

Therefore, in the correction method according to the embodiment, the input coordinates are corrected by the coordinate correction that differs depending on whether the touch panel 10 is touched with the one-point touch or the two-point touch. For example, in the correction method according to the embodiment, in the one-point touch, the coordinate correction is performed based on a total resistance value, and in the two-point touch, the coordinate correction based on the total resistance value is skipped. The total resistance value is the total sum of the resistance values of an interior of the touch panel 10 that is generated when touching the touch panel 10.

As a result, in the correction method according to the embodiment, in both the one-point touch and the two-point touch, it is possible to appropriately correct the input coordinates. Particularly, according to the correction method according to the embodiment, it is possible to relax a limitation of the resistance values of the external resistances Re.

Next, a configuration example of the input system 1 according to the embodiment will be described with reference to FIG. 2. FIG. 2 is a block diagram of the input system 1. First, the touch panel 10 will be described. As illustrated in FIG. 2, the touch panel 10 includes the first resistive film 11, the second resistive film 12 and the A/D converter 13.

The first resistive film 11 has terminals of a pair of electrodes along an X-axis direction of the touch panel 10. The second resistive film 12 has terminals of a pair of electrodes along a Y-axis direction of the touch panel 10. The inter-terminal voltage that is detected by each set of the terminals is output to the A/D converter 13 via each of the external resistances Re.

The A/D converter 13 converts the inter-terminal voltage as an analog voltage that is input from each of the first resistive film 11 and the second resistive film 12 into the conversion value as a digital value. That is, the A/D converter 13 converts the inter-terminal voltage into a numerical value according to a level (strength) of the inter-terminal voltage. Furthermore, the conversion value converted by the A/D converter 13 is output to the touch IC 20.

Subsequently, the touch IC 20 will be described. As illustrated in FIG. 2, the touch IC 20 includes a memory 21 and a controller 22. The memory 21 is, for example, implemented by semiconductor memory elements such as a RAM (Random Access Memory) and a flash memory, or storage devices such as a hard disk and an optical disk. In an example shown in FIG. 2, the memory 21 stores map information 21a and distance information 21b.

The map information 21a relates to a map indicating a relationship between the conversion value of the inter-terminal voltage and each set of the input coordinates. In the example described above, the conversion value takes a value of 0 to 1024 according to the level of the inter-terminal voltage for each of an X axis and a Y-axis, and the map indicating the input coordinates represented by each numerical value is stored in the memory 21 as the map information 21a.

Figure 3:
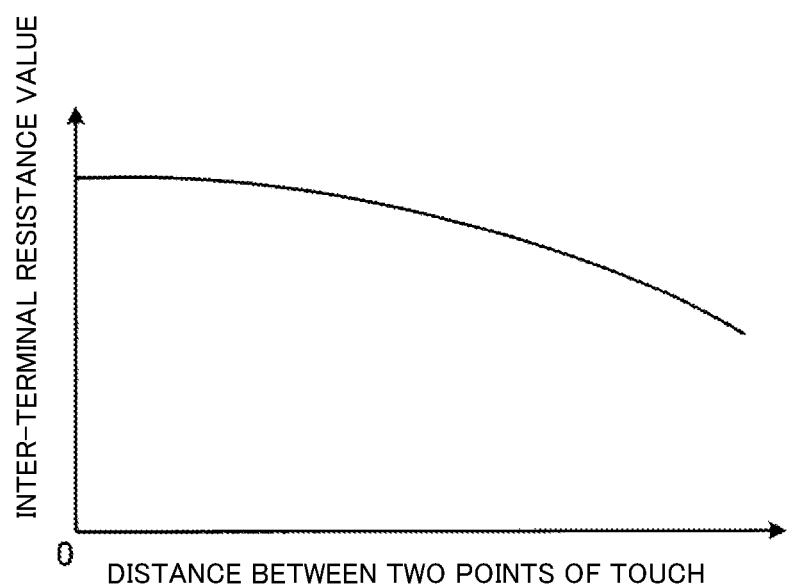
FIG. 3 illustrates one example of distance information.

The distance information 21b indicates the relationship between the distance between the two points of touch in the two-point touch and the inter-terminal resistance. FIG. 3 illustrates one example of the distance information 21b. In an example shown in FIG. 3, a vertical axis indicates an inter-terminal resistance value and a horizontal axis indicates the distance between the two points of touch. The distance between the two points of touch means the distance between the respective touch positions in the two-point touch.

As illustrated in FIG. 3, as the distance between the two points of touch becomes longer, the inter-terminal resistance value decreases. This is because, as described above, as the distance between the two points of touch becomes longer, resistance components that are connected in parallel in each of the first resistive film 11 and the second resistive film 12 increase. That is, the resistance components connected in series are connected in parallel.

The relationship between the distance between the two points of touch and the inter-terminal resistance value is derived beforehand by experiments or simulation, and such a relationship is stored in the memory 21 as the distance information 21b.

Referring back to FIG. 2, the controller 22 will be described. The controller 22, for example, a CPU, an MPU, or the like, uses the RAM as a work area to execute various programs stored in the memory 21. The controller 22 is implemented by executing these programs. The controller 22 is, for example, implemented by an integrated circuit such as an ASIC, an FPGA, or the like.

As illustrated in FIG. 2, the controller 22 includes a calculator 22a. The calculator 22a calculates the input coordinates indicating the touch position based on the digital conversion value converted by the A/D converter 13.

Specifically, in the one-point touch, the calculator 22a refers to the map information 21a, and calculates the input coordinates corresponding to the conversion value. That is, the calculator 22a calculates the X-axis coordinate of the input coordinates based on the inter-terminal voltage of the first resistive film 11, and calculates the Y-axis coordinate of the input coordinates based on the inter-terminal voltage of the second resistive film 12.

In the two-point touch, the calculator 22a calculates barycentric coordinates between the two points of touch and refers to the distance information 21b so as to calculate the distance between the two points of touch from the inter-terminal resistance value.

Figure 4:
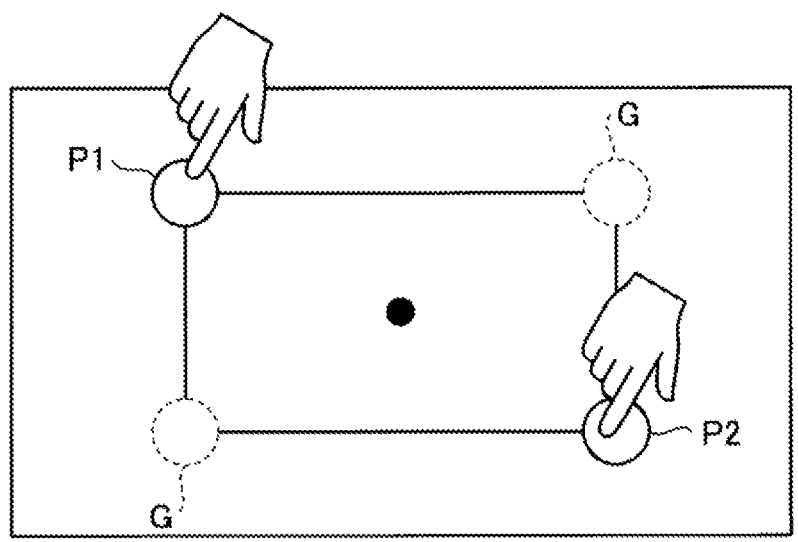
FIG. 4 illustrates a specific example of a ghost.

Subsequently, the calculator 22a performs ghost removal based on the barycentric coordinates and the distance between the two points of touch, and calculates the input coordinates of each of the two points of touch. Here, the ghost removal will be described with reference to FIG. 4. FIG. 4 illustrates a specific example of a ghost.

As illustrated in FIG. 4, for example, when a touch position P1 and a touch position P2 are simultaneously pressed, respectively, the touch IC 20 detects two ghosts G in addition to the touch positions P1 and P2.

Thus, the calculator 22a distinguishes between the touch positions P1 and P2 and the two ghosts G, and removes the two ghosts G. Ghost removal is not particularly limited, and any existing method may be appropriately used.

After the ghost removal has been performed, the calculator 22a calculates the input coordinates corresponding to each of the touch positions P1 and P2. The input coordinates calculated by the calculator 22a are input to the microcomputer 30.

Referring back to FIG. 2, the microcomputer 30 will be described. As illustrated in FIG. 2, the microcomputer 30 includes the memory 31 and the controller 32. The memory 31 is, for example, implemented by semiconductor memory elements such as a RAM (Random Access Memory) and a flash memory, or storage devices such as a hard disk and an optical disk. In the example shown in FIG. 2, the memory 31 stores normalization information 31a.

Figure 5:
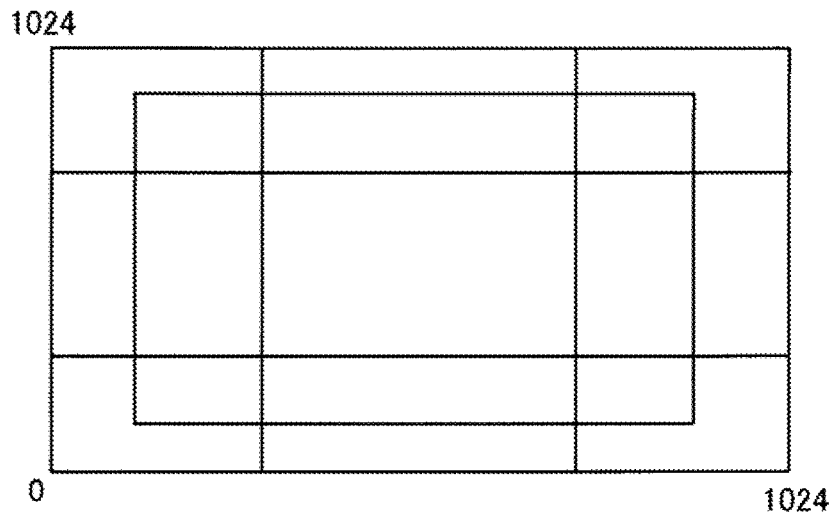
FIG. 5 illustrates one example of a division area.

The normalization information 31a relates to a normalization coefficient of the input coordinates for each division area obtained by dividing an operation area of the touch panel 10. FIG. 5 illustrates one example of the division area. For example, FIG. 5 shows a case in which each division area is a rectangular area.

The information in which the normalization coefficient of each of the X-axis and Y-axis coordinates of the input coordinates is associated with each division area is stored in the memory 31 as the normalization information 31a.

Referring back to FIG. 2, the controller 32 will be described. The controller 32, for example, a CPU, an MPU, or the like, uses the RAM as a work area to execute various programs stored in the memory 31. The controller 22 is implemented by executing these programs. The controller 32 is implemented by an integrated circuit such as an ASIC, an FPGA, or the like.

As illustrated in FIG. 2, the controller 32 includes a determination part 32a, a corrector 32b, and a display controller 32c. The determination part 32a determines the number of the touch points indicating a number of simultaneous touch positions on the touch panel 10.

In this embodiment, the determination part 32a determines whether the touch panel 10 is touched with the one-point touch in which the number of the touch points is one or the two-point touch in which the number of the touch points is two. For example, the determination part 32a determines the number of the touch points by referring to a resistor value of the touch IC 20. A determination result of the determination part 32a is notified to the corrector 32b.

The corrector 32b corrects the input coordinates indicating the touch position of each of the touch points using the coordinate correction that differs depending on whether the touch panel 10 is touched with the one-point touch in which the number of the touch points is one or the two-point touch in which the number of the touch points is two, which have been determined by the determination part 32a.

First, a process performed by the corrector 32b in the one-point touch will be described. In the one-point touch, the corrector 32b calculates the total resistance value, applies such a total resistance value to the coordinate correction and corrects the input coordinates. Here, the total resistance value is the total sum of the resistance values of the interior of the touch panel 10 that is generated when touching the touch panel 10.

The total resistance value is calculated from, for example, the conversion value described above and various types of parameters set in calibration that is performed before shipping or when the touch panel 10 is activated. The corrector 32b calculates the total resistance value for each conversion value of the first resistive film 11 (X-axis coordinate) and the second resistive film 12 (Y-axis coordinate). Here, the total resistance value is obtained by reflecting a secular change in the resistances of the first resistive film 11 and the second resistive film 12 and the resistance value change caused by a temperature change and removing the external resistances Re and internal resistances of various types of ICs.

Therefore, the corrector 32b applies the total resistance value to the coordinate correction so as to appropriately correct a shift of the input coordinates based on the external resistances Re and a shift of the input coordinates caused by a secular change and a temperature change.

On the other hand, as described above, in the two-point touch, the input coordinates calculated by the touch IC 20 is a value in consideration of the external resistances Re beforehand. Therefore, if the coordinate correction based on the total resistance value is applied to each set of the input coordinates calculated in the two-point touch, each set of the input coordinates is shifted outward from each set of the actual input coordinates by the amount of the external resistances Re.

As a result, in the two-point touch, the corrector 32*b* skips the coordinate correction based on the total resistance value applied in the one-point touch. That is, in the two-point touch, the input coordinates calculated by the touch IC 20 is applied.

As described above, the corrector 32*b* performs the coordinate correction that differs depending on whether the touch panel 10 is touched with the one-point touch or the two-point touch so as to improve the accuracy of the input coordinates in both the one-point touch and the two-point touch.

The corrector 32*b* normalizes the input coordinates as part of the coordinate correction. The normalization of the input coordinates is performed by referring to the normalization information 31*a* and multiplying the normalization coefficient of the input coordinates for each division area.

The display controller 32*c* converts the input coordinates corrected by the corrector 32*b* according to a screen resolution and switches a screen display based on the converted input coordinates.

Here, converting the input coordinates according to the screen resolution means that one pixel of a display screen corresponds to one set of the input coordinates. Switching the display screen means that, for example, a pointer, or the like, is moved according to current input coordinates. Various process results by the display controller 32*c* are output to the display (not shown), and the like.

Figure 6:
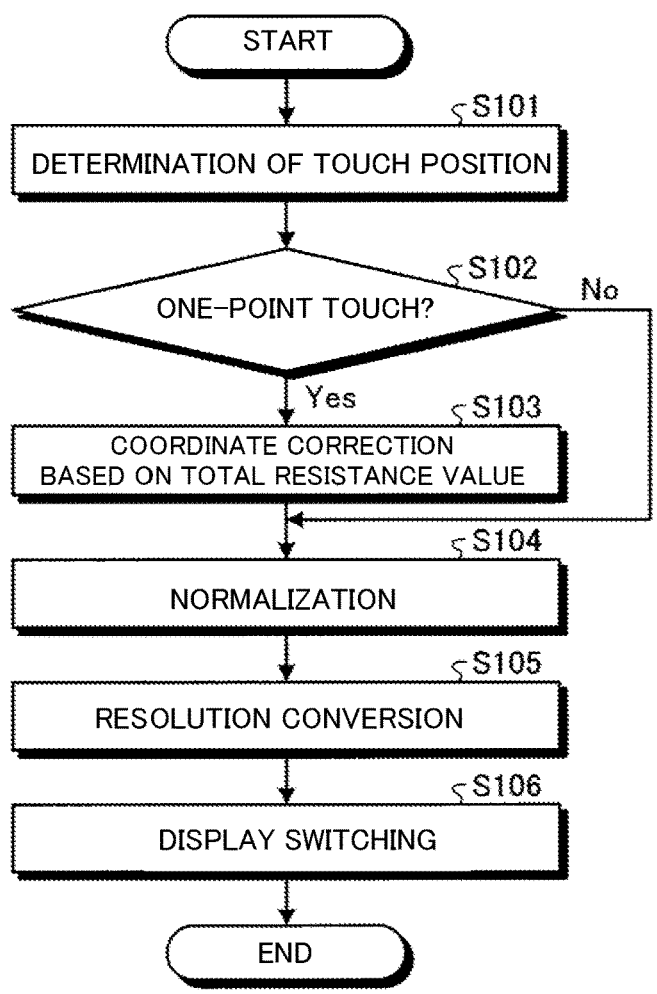
FIG. 6 is a flowchart illustrating a processing procedure executed by a microcomputer.

Next, a processing procedure executed by the microcomputer 30 according to the embodiment will be described with reference to FIG. 6. FIG. 6 is a flowchart illustrating the processing procedure executed by the microcomputer 30. The processing procedure shown below is repeatedly executed by the controller 32 of the microcomputer 30 for each calculation of the input coordinates by the touch IC 20.

As illustrated in FIG. 6, the microcomputer 30 performs determination of the touch position based on the input coordinates input from the touch IC 20 (a step S101) and determines whether the touch panel 10 is touched with the one-point touch or not (a step S102).

In the determination process in the step S102, for the one-point touch (Yes in the step S102), the microcomputer 30 performs the coordinate correction based on the resistance value (a step S103).

In the determination process in the step S102, when the touch panel 10 is not touched with the one-point touch, i.e., for the two-point touch (No in the step S102), the microcomputer 30 omits the step S103 and moves to a step S104.

Subsequently, the microcomputer 30 normalizes the input coordinates (the step S104) and performs resolution conversion on the input coordinates according to the screen resolution (a step S105). The microcomputer 30 performs display switching based on the input coordinates that have been resolution converted (a step S106) and ends the process.

As described above, the microcomputer 30 according to the embodiment (one example of the controller) includes the determination part 32*a* and the corrector 32*b*. The determination part 32*a* determines the number of the touch points indicating the number of the touch positions on the touch panel 10 having a resistive film. The corrector 32*b* corrects the input coordinates indicating the touch position of each of the touch points using the coordinate correction that differs depending on whether the touch panel 10 is touched with the one-point touch in which the number of the touch points is one or the two-point touch in which the number of the touch points is two, which have been determined by the determination part 32*a*. Therefore, according to the microcomputer 30 according to the embodiment, it is possible to accurately derive the input coordinates.

Figure 7:
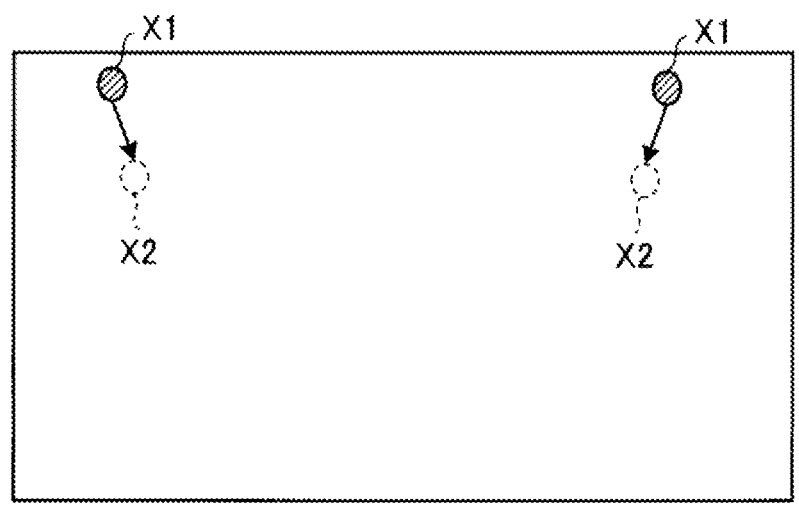
FIG. 7 is a schematic diagram illustrating a correction coefficient.

By the way, in the embodiment described above, in the two-point touch, a case in which the coordinate correction based on the total resistance value is skipped has been described, but the invention is not limited thereto. This will be described in detail with reference to FIG. 7. FIG. 7 is a schematic diagram illustrating a correction coefficient.

As described above, in the two-point touch, if the coordinate correction based on the total resistance value is performed, each set of the input coordinates is shifted outward from each set of the actual input coordinates by the amount of the external resistances Re.

On the other hand, the input coordinates to which the coordinate correction based on the total resistance value has been applied may be corrected by multiplying the correction coefficient. Here, the correction coefficient that is a coefficient according to the amount of the external resistances Re returns a shift of the input coordinates due to the coordinate correction based on the total resistance value to an original position.

An example shown in FIG. 7 shows a case in which the input coordinates are corrected to input coordinates X1 by the coordinate correction based on the total resistance value and a case in which the input coordinates X1 are re-corrected to input coordinates X2 by the correction coefficient. Even in this case, in both the one-point touch and the two-point touch, it is possible to accurately derive the input coordinates.

By the way, in the embodiment described above, a case in which the coordinate correction is performed on the input coordinates calculated by the touch IC 20 has been described, but the invention is not limited thereto. That is, after the inter-terminal voltage has been corrected based on the external resistances Re, the input coordinates may be calculated.

In the embodiment described above, a case in which the touch panel 10, the touch IC 20 and the microcomputer 30 are separately configured has been described, but may be integrated or dispersed appropriately.

It is possible for a person skilled in the art to easily come up with more effects and modifications. Thus, a broader modification of this invention is not limited to specific description and typical embodiments described and expressed above. Therefore, various modifications are possible without departing from the general spirit and scope of the invention defined by claims attached and equivalents thereof.

While the invention has been shown and described in detail, the foregoing description is in all aspects illustrative and not restrictive. It is therefore understood that numerous other modifications and variations can be devised without departing from the scope of the invention.

What is claimed is:

1. A control apparatus of a touch panel having a resistive film, the control apparatus comprising a microcomputer having a controller configured to function as:

a determination part that determines a number of touch points indicating a number of simultaneous touch positions on the touch panel, the determination part
  (a) determining the number of touch points to be a single touch point when the determination part receives a single set of input coordinates that have been determined for the single touch point, and
  (b) determining the number of touch points to be two touch points when the determination part receives two sets of input coordinates that have been determined for the two touch points; and
a corrector that:
  (i) when the determination part determines that the touch panel is touched with a one-point touch in which the number of the touch points is the single touch point, corrects the previously determined single set of input coordinates using a first coordinate correction process; and
  (ii) when the determination part determines that the touch panel is touched with a two-point touch in which the number of the touch points is the two touch points, corrects the previously determined two sets of input coordinates using a second coordinate correction process that differs from the first coordinate correction process.

2. The control apparatus according to claim 1, wherein
for the one-point touch, the corrector calculates a total resistance value as a total sum of resistance values of an interior of the touch panel that is generated when touching the touch panel and uses the total resistance value in the first coordinate correction process.

3. The control apparatus according to claim 2, wherein
the touch panel includes an external resistance and the corrector uses the total resistance value excluding the external resistance in the first coordinate correction process.

4. The control apparatus according to claim 2, wherein
for the two-point touch, the corrector does not use the total resistance value in the second coordinate correction process.

5. The control apparatus according to claim 3, wherein
for the two-point touch, the corrector, in the second coordinate correction process, uses the total resistance value to correct the previously determined two sets of input coordinates, and then multiplies a result by a correction coefficient determined according to an amount of the external resistance.

6. A correction method of input coordinates of a touch panel having a resistive film, the method comprising the steps of:
  (a) determining, by a controller of a microcomputer, a number of touch points indicating a number of simultaneous touch positions on the touch panel, the determining
    (i) determining the number of touch points to be a single touch point when the controller receives a single set of input coordinates that have been determined for the single touch point, and
    (ii) determining the number of touch points to be two touch points when the controller receives two sets of input coordinates that have been determined for the two touch points;
  (b) when the controller determines in step (a)(i) that the touch panel is touched with a one-point touch in which the number of the touch points is the single touch point, correcting, by the controller, the previously determined single set of input coordinates using a first coordinate correction process; and
  (c) when the controller determines in step (a)(ii) that the touch panel is touched with a two-point touch in which the number of the touch points is the two touch points, correcting, by the controller, the previously determined two sets of input coordinates using a second coordinate correction process that differs from the first coordinate correction process.

7. The method according to claim 6, wherein
for the one-point touch, the step (b) calculates a total resistance value as a total sum of resistance values of an interior of the touch panel that is generated when touching the touch panel and uses the total resistance value in the first coordinate correction process.

8. The method according to claim 7, wherein
the touch panel includes an external resistance and the step (b) uses the total resistance value excluding the external resistance in the first coordinate correction process.

9. The method according to claim 7, wherein
for the two-point touch, the step (c) does not use the total resistance value in the second coordinate correction process.

10. The method according to claim 8, wherein
for the two-point touch, the step (c), in the second coordinate correction process, uses the total resistance value to correct the previously determined two sets of input coordinates, and then multiplies a result by a correction coefficient determined according to an amount of the external resistance.

* * * * *